United States Patent
Zhao

(10) Patent No.: US 11,734,219 B2
(45) Date of Patent: Aug. 22, 2023

(54) AUTOMATIC READ CONTROL SYSTEM BASED ON A HARDWARE ACCELERATED SPI AND AUTOMATIC READ CONTROL METHOD

(71) Applicant: AMICRO SEMICONDUCTOR CO.,LTD., Guangdong (CN)

(72) Inventor: Wang Zhao, Guangdong (CN)

(73) Assignee: AMICRO SEMICONDUCTOR CO., LTD, Guangdong (CN)

( * ) Notice: Subject to any disclaimer, the term of this patent is extended or adjusted under 35 U.S.C. 154(b) by 0 days.

(21) Appl. No.: 17/631,476

(22) PCT Filed: Aug. 24, 2020

(86) PCT No.: PCT/CN2020/110685
§ 371 (c)(1),
(2) Date: Jan. 30, 2022

(87) PCT Pub. No.: WO2021/196507
PCT Pub. Date: Oct. 7, 2021

(65) Prior Publication Data
US 2023/0004517 A1   Jan. 5, 2023

(30) Foreign Application Priority Data
Mar. 28, 2020 (CN) .......................... 202010232675.4

(51) Int. Cl.
*G06F 13/00* (2006.01)
*G06F 13/42* (2006.01)
(Continued)

(52) U.S. Cl.
CPC ........ *G06F 13/4282* (2013.01); *G06F 9/4812* (2013.01); *G06F 13/1673* (2013.01)

(58) Field of Classification Search
None
See application file for complete search history.

(56) References Cited

U.S. PATENT DOCUMENTS

2002/0062408 A1   5/2002   Jahnke et al.
2010/0007717 A1*  1/2010   Spektor ................ H04N 13/254
                                                        348/43
(Continued)

FOREIGN PATENT DOCUMENTS

CN       102231143 A      11/2011
CN       103064805 A       4/2013
(Continued)

OTHER PUBLICATIONS

Pan, Shengmin, "The Design of an Enhanced DMA Controller Based On AMBA Bus", Full-text Database of China Excellent Master's Thesis Information Technology Series, Mar. 15, 2017.
(Continued)

*Primary Examiner* — Henry Tsai
*Assistant Examiner* — Dean Phan
(74) *Attorney, Agent, or Firm* — Gang Yu

(57) ABSTRACT

Disclosed is a hardware acceleration based automatic read control system and method for a serial peripheral interface (SPI). The automatic read control system includes an SPI module, an advanced peripheral bus (APB) module, an interrupt generation module, a direct memory access (DMA) controller, a state schedule control module, a register group module, a count signal generation module, a transmitted data buffer and a received data buffer; the state schedule control module, the register group module and the count signal generation module form a state machine system; and the state schedule control module controls automatic timed batch read of sensor data of the SPI according to configuration information of the register group module and counting and timing information of the count signal generation module.

17 Claims, 2 Drawing Sheets

(51) Int. Cl.
*G06F 9/48* (2006.01)
*G06F 13/16* (2006.01)

(56) References Cited

U.S. PATENT DOCUMENTS

| | | | | |
|---|---|---|---|---|
| 2016/0124878 A1* | 5/2016 | Pean | ................ | G06F 13/28 710/308 |
| 2017/0235692 A1* | 8/2017 | Ahamed | ............ | G06F 1/3215 710/308 |
| 2021/0089311 A1* | 3/2021 | Chen | ................ | G06F 9/48 |

FOREIGN PATENT DOCUMENTS

| | | |
|---|---|---|
| CN | 104021102 A | 9/2014 |
| CN | 104809094 A | 7/2015 |
| CN | 207008602 U | 2/2018 |
| CN | 109117396 A | 1/2019 |
| CN | 109564556 A | 4/2019 |
| CN | 109656850 A | 4/2019 |
| CN | 109933546 A | 6/2019 |
| CN | 110209613 A | 9/2019 |
| CN | 110456980 A | 11/2019 |
| CN | 111444123 A | 7/2020 |
| EP | 1187027 A3 | 8/2002 |

OTHER PUBLICATIONS

Qin, Yu, "Design and Verification of SPI Interface IP Core Based on APB Bus", Full-text Database of China Excellent Master's Thesis Information Technology Series, Mar. 15, 2016.

Sun, Yongjian, "Research and design of Smart Home remote monitoring system based on wireless sensor network", Full-text Database of China Excellent Master's Thesis Information Technology Series, Mar. 15, 2017.

Weilong Zhang, "A security coprocessor embedded system-on-chip architecture for smart metering, control and communication in power grid", 2014 12th IEEE International Conference on Solid-State and Integrated Circuit Technology (ICSICT), Oct. 31, 2014.

Fan, Long, "Design of Data Acquistion System for Intelligent Instrument Base on STM32", Full-text Database of China Excellent Master's Thesis Information Technology Series, Feb. 15, 2015.

* cited by examiner

AUTOMATIC READ CONTROL SYSTEM BASED ON A HARDWARE ACCELERATED SPI AND AUTOMATIC READ CONTROL METHOD

CROSS-REFERENCE TO RELATED APPLICATIONS

The present disclosure takes the Chinese Patent Application No. 2020102326754, filed on Mar. 28, 2020, and entitled "automatic read control system based on a hardware accelerated SPI and automatic read control method".

TECHNICAL FIELD

The disclosure relates to the field of data transmission processing, in particular to an automatic read control system based on a hardware accelerated SPI and automatic read control method.

BACKGROUND

A serial peripheral interface (SPI) is a full-duplex and synchronously-serial transmission bus first invented by Motorola. With a simple circuit structure, a fast transmission speed and reliable communication, the SPI is mainly used for communication between a microcontroller and peripheral devices. Nowadays, SPIs are increasingly used as high-speed sensor interfaces.

The development of robot intelligence relies on the application support of various sensors, among which gyroscopes, optical flow meters, etc. are widely used in robot motion control and other fields. A robot microcontroller obtains data information of peripheral sensors such as gyroscopes and optical flow meters in real time through SPIs. Since data is read frequently from the gyroscopes and the optical flow meters, a precise timer is required to control the read process. If data is read frequently by triggering software interrupts, frequent interrupts will affect the smoothness of software execution, reduce software efficiency, and provoke impact on real-time processing.

SUMMARY

Aiming at the above problems, the disclosure provides a hardware based automatic read control system for serial peripheral interface (SPI) sensor data. Since data read back from sensors such as gyroscopes and optical flow meters needs to be calculated by accurate timing, and requirement of real-time processing is difficult to met if software is used, a hardware design manner is adopted to realize automatic read of data of a memory to be read. The specific technical solution is as follows:

The automatic read control system based on a hardware accelerated SPI interface is provided, where the automatic read control system is connected to a central processing unit (CPU) and an external memory to be read separately, includes an SPI module, an advanced peripheral bus (APB) module, an interrupt generation module and a direct memory access (DMA) controller, and further includes a state machine controller, a transmitted data buffer and a received data buffer. The SPI module is used for completing, in an SPI bus time sequence, data communication between the automatic read control system and the external memory to be read thereof, and providing a transmission channel between the transmitted data buffer and the external memory to be read and a transmission channel between the received data buffer and the external memory to be read for the transmitted data buffer and the received data buffer respectively. The APB module is used for configuring, in an APB time sequence, configuration information sent by the CPU to the register group module. The state machine controller is used for receiving configuration information transmitted by the APB module, internally includes a driving source for generating a count signal, schedules, under drive of the count signal of the internal driving source and in combination with the configuration information, a corresponding work state, and controls the received data buffer to read out data of the external memory to be read in batches according to a certain read frequency in each round of reading. The transmitted data buffer is used for receiving an addressing address which is configured by the register group module and used for accessing and reading the data of the external memory to be read, such that in each round of accessing and reading, the automatic read control system supports addressing of destination addresses and/or source addresses of different groups of data of the external memory to be read. The received data buffer is used for automatically storing, under control of the DMA controller and according to the work state scheduled by the state machine controller, the data read from the external memory to be read and automatically transmitting internally stored data to the external data memory for calling by software, where the DMA controller is used for reading out, by means of the SPI module, the data of the external memory to be read and storing the data in the received data buffer, or reading data from the received data buffer and storing the data in the external data memory. The interrupt generation module is used for generating an interrupt signal to inform the CPU that reading the data is completed after the automatic read control system completes one round of reading data of the external memory to be read, where a batch of data, read in each round, of an external memory to be read is divided into different groups according to the configuration information of the register group module, and a destination address and a source address configured for each group of data are different.

The disclosure further provides an automatic read control method based on the automatic read control system. The method includes: step A, receiving, in an APB time sequence, configuration information transmitted by a CPU; step B, scheduling, under drive of a count signal of an internal driving source of a state machine controller and in combination with the configuration information, a corresponding work state; controlling a received data buffer to send addressing addresses of different groups of data of an external memory to be read to a transmitted data buffer in each round of reading; and then controlling, in combination with the scheduled corresponding work state, the received data buffer to read out, according to a certain read frequency and by means of a DMA controller, the data of the external memory to be read in batches; and step C, generating, after one round of reading data of the external memory to be read is completed, an interrupt signal to inform the CPU that reading the data is completed, where a batch of data, read in each round, of an external memory to be read is divided into different groups according to the configuration information of the register group module, and a destination address and a source address configured for each group of data are different.

DETAILED DESCRIPTION OF THE EMBODIMENTS

Figure 1:
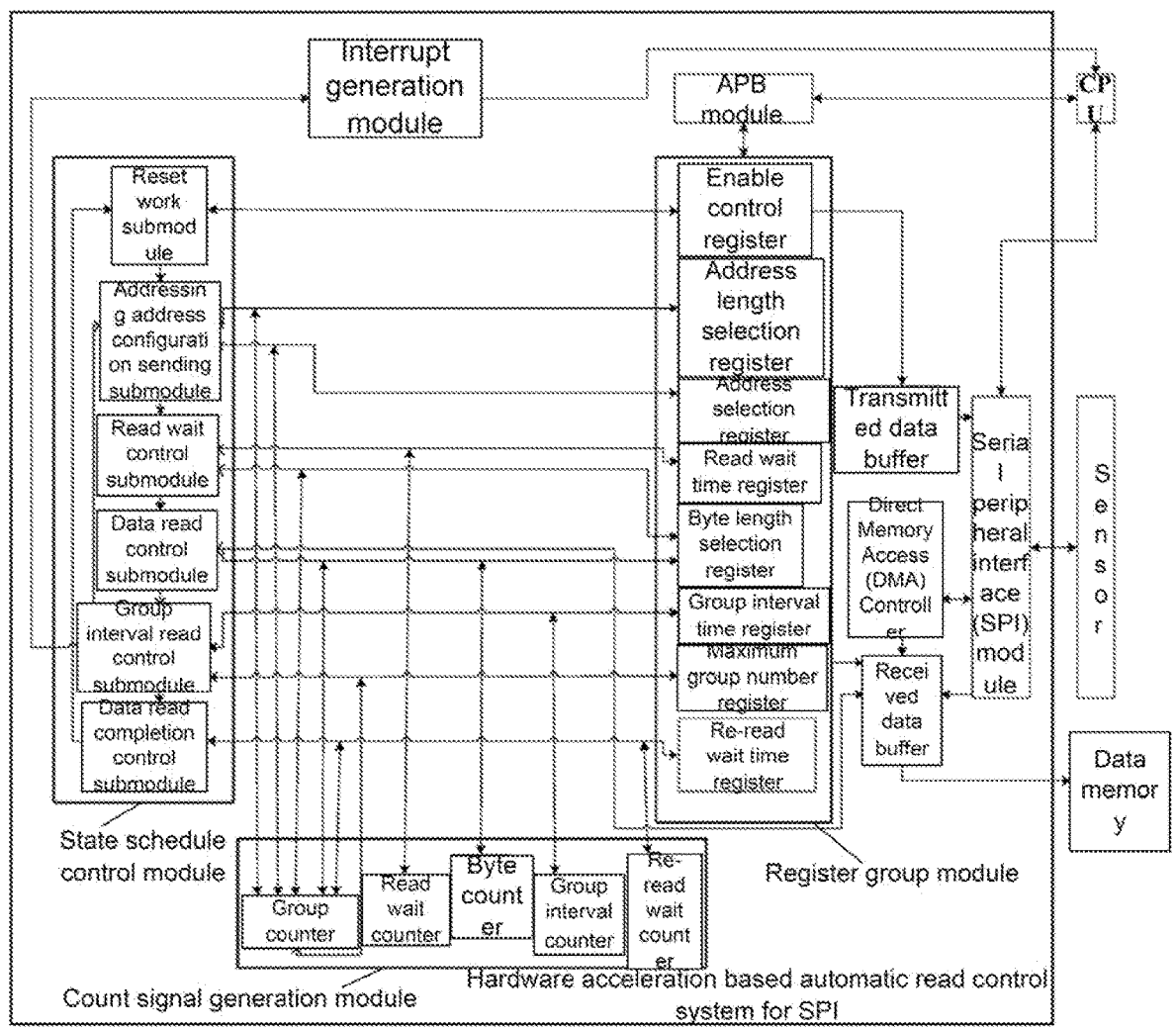
FIG. 1 is a schematic diagram of a framework of an automatic reading system based on a hardware accelerated SPI interface.

The embodiments of the disclosure will be described in detail below with reference to the accompanying drawings. It should be noted by those skilled in the art that all modules, submodules, controllers and systems disclosed in the disclosure are digital logic circuits, which are designed by using hardware description languages such as a very-high-speed integrated circuit hardware description language (VHDL) or a Verilog hardware description language, and are mapped to form netlist information which can be used for producing and manufacturing integrated circuits.

The existing sensors, for example, need a precise timing mechanism to read data from a gyroscope and an optical flow sensor. If software is used, there will be much central processing unit (CPU) interrupt query flow, which will directly affect a real-time processing effect of data. Therefore, automatic data read of the gyroscope and the optical flow sensor is realized by hardware design. In the embodiment, a butt joint to a memory to be read is realized by a serial peripheral interface (SPI) or other slave bus interfaces. A realization principle is that the SPI is driven, according to set time, to read the data of the memories to be read in the gyroscope and the optical flow sensor in batches, the read data is stored in a sending first-in first-out (FIFO) memory, and then the data is automatically transmitted out, under schedule of a state machine, by means of a general direct memory access (DMA) to be used by the software.

An automatic read control system based on a hardware accelerated SPI interface is provided. The automatic read control system is connected to the CPU and the external memory to be read separately, where the memory to be read here may be a sensor device. The automatic read control system includes a general SPI module, a general advanced peripheral bus (APB) module, a general interrupt generation module and a general direct memory access (DMA) controller. Different from an existing system, the automatic read control system further includes a state machine controller, a transmitted data buffer and a received data buffer. The SPI module is used for completing, in an SPI bus time sequence, data communication between the automatic read control system and the external memory to be read thereof, and providing a transmission channel between the transmitted data buffer and the external memory to be read and a transmission channel between the received data buffer and the external memory to be read for the transmitted data buffer and the received data buffer respectively. The APB module is used for configuring, in an APB time sequence, configuration information sent by the CPU to the register group module. The state machine controller is used for receiving configuration information transmitted by the APB module, internally includes a driving source for generating a count signal, schedules, under drive of the count signal of the internal driving source and in combination with the configuration information, a corresponding work state, and controls the received data buffer to read out data of the external memory to be read in batches according to a certain read frequency in each round of reading. The transmitted data buffer is used for receiving an addressing address which is configured by the register group module and used for accessing and reading the data of the external memory to be read, such that in each round of accessing and reading, the automatic read control system supports addressing of destination addresses and/or source addresses of different groups of data of the external memory to be read. The received data buffer is used for automatically storing, under control of the DMA controller and according to the work state scheduled by the state machine controller, the data read from the external memory to be read and automatically transmitting internally stored data to the external data memory for calling by software, where the DMA controller is used for reading out, by means of the SPI module, the data of the external memory to be read and storing the data in the received data buffer, or reading data from the received data buffer and storing the data in the external data memory. The interrupt generation module is used for generating an interrupt signal to inform the CPU that reading the data is completed after the automatic read control system completes one round of reading data of the external memory to be read, where a batch of data, read in each round, of an external memory to be read is divided into different groups according to the configuration information of the register group module, each group of data matches a corresponding group number, and a destination address and a source address configured for each group of data are different.

As one embodiment, the state machine controller includes a register group module, a count signal generation module and a state schedule control module. The register group module is used for receiving the configuration information transmitted by the APB module, where the configuration information includes delay configuration information and data length configuration information, and configuring the state schedule control module, the count signal generation module, the transmitted data buffer and the received data buffer. The count signal generation module includes a timer and a counter, where the timer is used for counting to generate, by taking the delay configuration information of the register group module as a timing critical parameter, a timing signal for determining a read frequency of each group of data of the external memory to be read. The counter is used for counting to generate, by taking the data length configuration information of the register group module as a data length critical parameter, a count signal for determining a data length of each group of data of the external memory to be read. The state schedule control module is used for generating, according to the configuration information of the register group module and counting information and timing information of the count signal generation module, a schedule action and a work state for the automatic read control system to automatically read the data of the external memory to be read such that the automatic read control system may automatically read, at a certain time interval, different groups of data of the external memory to be read.

As shown in FIG. 1, the automatic read control system is connected to the CPU and the external memory to be read separately, and includes the general SPI module, the general APB module, the general interrupt generation module and the general DMA controller, where the conventional interface modules are correspondingly configured according to bus types, such as an SPI bus, an APB bus and a DMA bus. The CPU in the embodiment is replaced by a single chip microcomputer or a system on chip (SOC), and the external memory to be read may be a communication device with a serial interface or a parallel interface. The automatic read control system further includes a state schedule control module, a register group module, a count signal generation module, a transmitted data buffer and a received data buffer.

The SPI module is a channel for the automatic read control system to access the external memory to be read, and is used for completing, in a general SPI bus time sequence, data communication between the automatic read control system and the external memory to be read thereof, and providing a transmission channel between the transmitted data buffer and the external memory to be read and a transmission channel between the received data buffer and the external memory to be read for the transmitted data buffer and the received data buffer respectively. By means of the transmitted data buffer and the received data buffer, an interaction mechanism between the SPI module and the external memory to be read is the same as that of the SPI bus.

The APB module is a channel for the CPU to access the automatic read control system, and is used for configuring, in an APB time sequence, data reading configuration information sent by the CPU to the register group module, so as to complete communication between the CPU and the automatic read control system.

The register group module is used for receiving configuration information transmitted by the APB module and may configure control parameters of the state schedule control module, the count signal generation module, the transmitted data buffer and the received data buffer by means of a control signal line. The CPU configures parameters of registers in the register group module by means of the APB module.

The count signal generation module is used for counting to generate, according to the configuration information of the register group module, a timing signal for determining a read frequency of each group of data of the external memory to be read, and further generate a count signal for determining a data length of each group of data of the external memory to be read. The timer or the counter in the count signal generation module may divide frequency of a clock signal of the system, and in combination with the read frequency and the count signal, control over a serial communication rate of the automatic read control system is completed.

The state schedule control module is used for scheduling a work state of the whole automatic read control system, receives signals of the register group module and the count signal generation module, and is used generating, according to the configuration information of the register group module and counting and timing information of the count signal generation module, a schedule action and a work state for the automatic read control system to automatically read the data of the external memory to be read such that the automatic read control system may automatically read, at a certain time interval, different groups of data of the external memory to be read, where actions and signals generated by the state schedule control module include: an enable signal, an abnormal signal, a count control signal, a buffer read/write enable signal, a chip select signal, etc.

The transmitted data buffer is used for receiving an addressing address which is configured by the register group module and used for accessing and reading the data of the external memory to be read, such that in each round of accessing and reading, the automatic read control system supports addressing of destination addresses and/or source addresses of different groups of data of the external memory to be read, where the addressing address buffered by the transmitted data buffer is sent to the external memory to be read by means of the SPI module.

The received data buffer is used for storing, under control of the general DMA controller and according to schedule action and work state signals of the state schedule control module, the data read from the external memory to be read and automatically transmitting internally stored data to the external data memory for calling by software, where the DMA controller is used for reading out, by means of the SPI module, the data of the external memory to be read and storing the data in the received data buffer, or reading data from the received data buffer and storing the data in the external data memory.

The interrupt generation module is used for generating an interrupt signal to inform the CPU that reading the data is completed after the automatic read control system completes one round of reading data of the external memory to be read, that is, after reading the data of the sensors such as the gyroscopes or the optical flow meters is carried out once.

Reading data in batches is: a batch of data, read each round, of the external memory to be read is divided, according to the configuration information of the register group module, into different groups of data to be read. The destination address and the source address of each group of data to be read are different. The data length of each group of data to be read may be different, but may have a plurality of values, which are read out sequentially according to a configured addressing address. The received data buffer reads data, which may be addressed according to the source address and the destination address of each group of data, of the external memory to be read. According to software initialization configuration, a plurality of groups of different destination addresses may be accessed at one time such that the data may be processed in batches, and a plurality of kinds of data information of the sensors may be read and refreshed more efficiently.

Compared with the prior art, the automatic read control system based on a hardware accelerated SPI interface disclosed in the embodiment has the effects that by means of hardware automatic schedule work and a hardware delay module, the SPI reads the data of the external memory to be read (the gyroscope/and the optical flow meter) at regular time, so as to meet requirements of different read frequencies. In the embodiment, hardware acceleration is carried out by using the above modules to replace a software algorithm, an inherent advantage of processing speed of hardware is brought into full play, the quantity of software interrupt delay programs used by the CPU is greatly reduced, unnecessary CPU reading is reduced, software processing burdens of the CPU are reduced, and a technical effect of hardware acceleration is also realized.

Specifically, as shown in FIG. 1, the register group module includes an enable control register auto_read_en, an address length selection register byte_length_sel, an address selection register addr_search, a read wait time register wait_time_num, a byte length selection register byte_length_sel, a group interval time register group_time_num, a maximum group number register group_num, and a re-read wait time register next_time_num.

The enable control register auto_read_en is used for configuring reset information for the automatic read control system, and when the enable control register uto_read_en is set as 1, the automatic read control system is controlled to enter an addressing work state.

The address selection register ddr_search_sel is used for configuring addressing addresses for the state schedule control module and the transmitted data buffer, where addressing addresses include addressing addresses of all groups of data of the external memory to be read, and the addressing address matches a group number of a group to which a batch of data of the external memory to be read is divided. For example, an addressing address of a group of data with group number 1, an addressing address of a group of data with group number 2 and an addressing address of a group of data with group number 3 are divided and stored.

In the embodiment, three groups of address selection registers addr_search_0, addr_search_1 or addr_search_2 are divided according to a grouping condition of the read data, and addressing address data of the system may be stored in a register manner.

The address length selection register addr_length_sel is used for configuring addressing address lengths for the state schedule control module and the transmitted data buffer, where the addressing address lengths include addressing address lengths of all groups of data of the external memory to be read, and the addressing address length matches a group number of a group to which a batch of data of the external memory to be read is divided. For example, an addressing address length of a group of data with group number 1, an addressing address length of a group of data with group number 2 and an addressing address length of a group of data with group number 3 are divided and stored. In the embodiment, three groups of address length selection registers addr_length_0, addr_length_1 or addr_length_2 are divided according to the grouping condition of the read data, and the addressing address length of the system may exist in a form of a register. In the embodiment, the addressing address length in the address length selection register addr_length_sel may be set as 8 bits or 16 bits; when addr_length_sel is 0, an 8-bit addressing address is configured; and when addr_length_sel is 1, a 16-bit addressing address is configured, such that the addressing address length is flexible and controllable, and has better compatibility for different types of sensors such as gyroscopes and optical flow sensors.

The read wait time register wait_time_num is used for configuring a read delay parameter for the state schedule control module and the received data buffer, where the read delay parameter is a timing parameter set after the transmitted data buffer sends the addressing address and before the received data buffer starts receiving the data of the external memory to be read.

The byte length selection register byte_length_sel is used for configuring a data length for reading each group of data of the external memory to be read for the state schedule control module and the received data buffer, where the data length matches a group number of a group to which a batch of data of the external memory to be read is divided. For example, a data length of a group of data with group number 1, a data length of a group of data with group number 2 and a data length of a group of data with group number 3 are divided and stored. In the embodiment, the data length is configured to be 1 to 32 bytes, and the data of 1 to 32 bytes is read from the external memory to be read each time, which may be understood as the sum of the byte lengths of each data, and the length of one byte may be 8 bits. In the embodiment, the byte length selection registers are divided into three types of byte length selection registers ddr_search_0, addr_search_1 or addr_search_2 according to the grouping condition of the read data.

The group interval time register group_time_num is used for configuring a group delay parameter for the state schedule control module and the received data buffer, where the group delay parameter is a time interval parameter for reading two adjacent groups of data of the external memory to be read, and is also a delay parameter for sequentially accessing addresses of two adjacent groups of data.

The maximum group number register group_num is used for configuring a maximum group number of the data, read in each round, of the external memory to be read for the automatic read control system. Preferably, before sensor data reading is started, in the embodiment, the automatic read control system is configured by software to address at most three different destination addresses in one round of reading data.

The re-read wait time register next_time_num is used for configuring a re-read delay parameter for the automatic read control system, where the re-read delay parameter is a timing parameter set after the received data buffer completes a current round of receiving the data of the external memory to be read and before the received data buffer starts a next round of receiving the data of the external memory to be read.

It is worth noting that timing critical parameters in the above embodiments include the read delay parameter configured by the read wait time register, the group delay parameter configured by the group interval time register and the re-read delay parameter configured by the re-read wait time register. Data length critical parameters include the data length configured by the byte length selection register and the maximum group number configured by the maximum group number register.

Compared with the prior art, the register group module disclosed by the proposal supports flexible configuration of read information of sensor data, by means of the read wait time register wait_time_num, the group interval time register group_time_num and the re-read wait time register next_time_num, different timing requirements of sensor data reading process are flexibly configured, and control over a serial communication rate of the SPI controller is completed, such that requirements of different read frequencies are met.

Specifically, as shown in FIG. 1, the count signal generation module includes a group counter group_cnt, a read wait counter wait_time_cnt, a byte counter byte_cnt, a group interval counter group_time_cnt, and a re-read wait counter next_time_cnt.

The group counter group_cnt is used for counting and outputting the group number of the data, currently read by the received data buffer, of the external memory to be read, a count value of the group counter group_cnt is preferably 0, 1 or 2, and the group counter group_cnt may be used for configuring three groups of different addressing addresses, three groups of different addressing address lengths and three groups of different read data lengths. Therefore, the data of the external memory to be read is read, in groups, by the received data buffer according to configuration of the destination address and the source address.

The read wait counter wait_time_cnt is used for keeping, after the transmitted data buffer sends the addressing address and before the received data buffer starts receiving the data, counting until a count value reaches the read delay parameter, that is, counting to a configured value of the read wait time register wait_time_num, and then being reset.

The byte counter byte_cnt is used for counting a byte length of each data read in by the received data buffer, that is, counting the number of bytes of the read data, and being reset when the count value reaches a data length, configured by the byte length selection register byte_length_sel, of a group of data with a group number corresponding to the current count value of the group counter group_cnt (a group number matches). It should be noted that the data length is the sum of byte lengths of a group of data, and the byte counter byte_cnt counts one byte length each time the byte counter byte_cnt counts 8 bits. The byte counter byte_cnt is used for generating a count signal which determines the data length of each group of data of the external memory to be read.

The group interval counter group_time_cnt is used for keeping counting during an interval of successively reading two adjacent groups of data by the received data buffer until a count value reaches a group delay parameter, that is, counting to the group delay parameter configured by the group interval time register group_time_num, and then being reset.

The re-read wait counter next_time_cnt is used for keeping counting after the automatic read control system completes a current round of reading the data of the external memory to be read and starts a next round of reading the data of the external memory to be read until a count value reaches a re-read delay parameter, that is, counting to the re-read delay parameter configured by the re-read wait time register next_time_num, and then being reset.

The sum of the count values of the read wait counter, the group interval counter and the re-read wait counter, that is, the sum of wait delay parameters required for one round of reading data of the memory data to be read, forms a timing signal for determining a read frequency of each group of data of the external memory to be read. The count signal generation module disclosed by the embodiment sets addresses and data, and a time interval for accessing addresses of two adjacent groups of data. By means of a plurality of timers, requirements of different read frequencies are met, such that sensor data is automatically refreshed in real time. The timing and counting information generated by the group counter group_cnt and byte counter byte_cnt may be used for configuring a byte length/data length of the read data, such that grouping read of the data of the external sensor is possible, and then addressing of data information at more destination addresses may be realized It is worth noting that the timers of the state machine controller of the above embodiment include the read wait counter, the group interval counter and the re-read wait counter. The counters of the state machine controller include the group counter and the byte counter.

Preferably, the automatic read control system supports addressing of three different groups of destination addresses in one round of reading the data of the external memory to be read. Therefore, data read efficiency is improved.

Flow of reading the data of the sensors such as the gyroscopes and the optical flow meters is basically the same, and includes: first send addressing addresses, and then read back data. In the embodiment of the disclosure, one state machine is adopted to realize related control flow, and a state code of the state machine is preferably a single heat code, such that a decode logic of a system circuit is simplified to a certain extent. The state schedule control module set in the embodiment corresponds to the state machine, and the state machine may jump and operate in each state and needs to be configured with the above various registers, timers and/or counters. Steps of state jump and schedule may be different, but conditions of jump may not be separated from support of these devices. The state machine has six states in total, which correspond to six submodules included in the state schedule control module respectively: an idle state IDLE is controlled by a reset work submodule, a sending addressing state SEND_ADDR is controlled by an addressing address configuration sending submodule, a data read wait state READ_WAIT is controlled by a read wait control submodule, a data read and receive state READ_DATA is controlled by a data read control submodule, a group read interval wait state GROUP_GAP is controlled by a group interval read control submodule, and a data read completion state READ_OVER is controlled by a data read completion control submodule. Therefore, the state schedule control module generates, according to the configuration information of the register group module and counting and timing information of the count signal generation module, a schedule action and a work state for the automatic read control system to automatically read the data of the external memory to be read such that the automatic read control system may automatically read, at a certain time interval, different groups of data of the external memory to be read.

It should be noted that the state machine mentioned in the embodiment of the disclosure is composed of a state register and a combinational logic count circuit, may carry out state transition according to a preset state according to a control signal, and is a control center for scheduling related signal actions and completing specific operations. In the embodiment, a control logic, involved in the related modules in the automatic read control system, particularly the register group module, the count signal generation module and the state schedule control module included in the state machine controller, for reading data is decomposed into a finite number of stable states, an event is determined on each state, and continuous processing is changed into discrete digital processing, such that work characteristics of a hardware circuit are met.

The idle state IDLE is a default state of the system, and system enters the idle state IDLE when being powered on and reset. The reset work submodule is used for configuring, after the automatic read control system is powered on and reset, by means of the enable control register, reset information; and jumping, when the enable control register uto_read_en is set as 1, into the SEND_ADDR state to schedule the addressing address configuration sending submodule start working.

The addressing address configuration sending submodule enables, according to the configuration information of the address length selection register addr_len_sel and the address selection register addr_search and the counting information of the group counter group_cnt, the automatic read control system to work in the sending addressing state SEND_ADDR. In the sending addressing state SEND_ADDR, the addressing address configuration sending submodule is used for selecting, according to the group number corresponding to the count value of the group counter group_cnt, an addressing address length, matching the group number, of a group of data from the address length selection register addr_len_sel. The addressing address configuration sending submodule may be set as one, matching the current count value of the group counter group_cnt, of the three groups of address length selection registers addr_length_0, addr_Length_1 or addr_Length_2 by means of a count function of the group counter group_cnt, so as to adapt to be divided into different groups of data. Specifically: when the count value of the group_cnt is 0, that is, the corresponding group number is 0, addr_length_sel is address length selection register addr_length_0; when the count value of the group_cnt is 1, that is, the corresponding group number is 1, addr_length_sel selects is addr_Length_1; and when the count value of the group_cnt is 2, that is, the corresponding group number is 2, addr_length_sel is addr_length_2. It should be noted that the addressing address lengths configured by the above groups of address length selection registers are different. For example, when addr_length_sel is 0, an 8-bit addressing address is sent; and when addr_length_sel is 1, a 16-bit addressing address is sent, such that the addressing address length selected by the addressing address configuration sending submodule is flexible and controllable, and may be compatible with different types of sensors such as the gyroscopes and the optical flow sensors. Meanwhile, according to the group number corresponding to the count value of the group counter group_cnt, the addressing address configuration sending submodule may select the addressing address, matching the group number, of a group of data from the address selection register addr_search. The addressing address configuration sending submodule may be set as one, matching the current count value of the group counter group_cnt, of the three groups of address selection registers addr_search_0, addr_search_1 or addr_search_2 by means of the count function of the group counter group_cnt. Specifically: when the count value of the group_cnt is 0, that is, the corresponding group number is 0, addr_search_sel is address selection register addr_search_0; when the count value of the group_cnt is 1, that is, the corresponding group number is 1, addr_search_sel selects is addr_search_1; and when the count value of the group_cnt is 2, that is, the corresponding group number is 2, addr_search_sel is addr_search_2. The addressing addresses selected by the above groups of address selection registers are different. The addressing address configuration sending submodule updates configuration values of the address length selection register addr_len_sel and the address selection register addr_search, sets an address reload control signal load_addr as 1, and sends the addressing address in the address selection register addr_search_sel to the transmitted data buffer, such that the transmitted data buffer sends, by means of the SPI module, the addressing address for reading the external memory to be read. After sending the addressing addresses, the transmitted data buffer jumps into the data read wait state READ_WAIT, and the read wait control submodule is scheduled start working, where the addressing addresses and the addressing address length are different according to different group numbers of the data.

The read wait control submodule enables, according to the configuration information of the read wait time register wait_time_num and the byte length selection register byte_length_sel and the counting information of the group counter group_cnt and the read wait counter wait_time_cnt, the automatic read control system to work in the data read wait state READ_WAIT. In the data read wait state READ_WAIT, the read wait control submodule starts the read wait counter to count, so as to realize time delay from sending the addressing addresses to receiving data of the automatic read control system, resets the read wait counter wait_time_cnt when a count value of the read wait counter wait_time_cnt reaches a read delay parameter, that is, is equal to a timing parameter configured by a read wait time register wait_time_num, which indicates that timing time is up, then carries out scheduling and enters the data read and receive state READ_DATA, and controls the data read control submodule start working, so as to generate a time interval between the address and the data.

In the data read wait state READ_WAIT still, before the count value of the read wait counter reaches the read delay parameter, the data length, matching the current count value of the group counter, of a group of data is selected from the byte length selection register, and a configuration value of the byte length selection register byte_length_sel is updated, so as to improve a resource utilization rate of the state machine. The read wait control submodule further works according to the group number corresponding to the count value of the group counter group_cnt. The byte length selection register byte_length_sel may be set as one, matching the current count value of the group counter group_cnt, of three groups of byte length selection registers byte_length_0, byte_Length_1 or byte_Length_2. Specifically: when group_cnt=0, byte_length_sel=byte_length_0; when group_cnt=1, byte_length_sel=byte_Length_1; and when group_cnt=2, byte_length_sel=byte_Length_2. It is worth noting that different data lengths of the embodiment may be stored in the corresponding byte length selection registers, such as byte_length_0, byte_Length_1, or byte_Length_2.

The data read control submodule enables, according to the configuration information of the byte length selection register byte_length_sel and the counting information of the byte counter byte_cnt and the group counter group_cnt, the automatic read control system to work in the data read and receive state READ_DATA. In the data read and receive state READ_DATA, the byte counter byte_cnt is started to count the sum of byte lengths of each group of data read in the received data buffer, that is, every time the received data buffer reads in one byte length of the data, the count value of the byte counter byte_cnt is increased by one. When the byte counter counts the data length (including one of the following situations: when group_cnt=0, byte_length_sel=byte_length_0; when group_cnt=1, byte_length_sel=byte_Length_1; and when group_cnt=2, byte_length_sel=byte_Length_2), configured by the byte length selection register and matching the current count value of the group counter, of a group of data every time, it is indicated that reading a group of data is completed, the count value of the group counter group_cnt is controlled to be increased by one, and the byte counter byte_cnt is reset, such that the state schedule control module controls the received data buffer to complete reading the current group of data of the external memory to be read and start reading the next group of data of the external memory to be read. Then scheduling is carried out to enter the group read interval wait state GROUP_GAP, the group interval read control submodule is started to work, and a switching effect between bytes of the same group of data is realized. Each time the received data buffer reads the data of one byte length, the data is transmitted, under control of the general DMA controller and by means of the SPI module, to external software, such that the data of the sensors is refreshed by means of the software.

The group interval read control submodule is used for enabling, according to the configuration information of the group interval time register group_time_num and the maximum group number register group_num and the counting information of the group counter group_cnt and the group interval counter group_time_cnt, the automatic read control system to work in the group read interval wait state GROUP_GAP. The group counter group_cnt still keeps counting in this state, and when the count value of the group counter group_cnt reaches the maximum group number, configured by the maximum group number register group_num, of data read in the current round, that is, when it is determined that the automatic read control system completely reading out all the groups of data in one round of reading from the external memory to be read, the count value of the group counter group_cnt is reset. Then scheduling is carried out to enter the data read completion state READ_OVER, and the data read completion control submodule is controlled start working. Meanwhile, an interrupt request signal auto_read_int sent by the automatic read control system is set as 1 to inform the CPU that reading of all groups of sensor data in the current round is completed. If all the groups of data of the external memory to be read are not completely read out in one round of reading, the group interval counter group_time_cnt is controlled to start counting. When the count value of the group interval counter group_time_cnt reaches the group delay parameter configured by the group interval time register group_time_num, it is indicated that the wait time between reading two adjacent groups of data is reached, the group interval counter group_time_cnt is reset, and scheduling is carried out to enter the sending addressing state SEND_ADDR. The addressing address configuration sending submodule reenters a work state to prepare to read the next group of data of the external memory to be read, such that a switching read control effect between different groups of data is generated, and meanwhile, a time interval for reading the data and a time interval between the addresses are generated.

The data read completion control submodule is used for enabling, according to the configuration information of the re-read wait time register next_time_num and the counting information of the group counter group_cnt and the re-read wait counter next_time_cnt, the automatic read control system to work in the data read completion state READ_OVER. The data read completion control submodule starts the re-read wait counter next_time_cnt to count at regular time and ends reading the data of the external memory to be read in a current round by setting the delay wait parameter. When the count value of the re-read wait counter next_time_cnt reaches the re-read delay parameter configured by the re-read wait time register next_time_num, it is indicates that the delay wait time is arrived, the re-read wait counter next_time_cnt is reset, and scheduling is carried out to enter the idle state IDLE. The reset work submodule is controlled to reenter a work state so as to start a next round of reading the data of the external memory to be read. Therefore, an effect of time delay of the end of reading is generated. In the embodiment, the data read completion control submodule, the group interval read control submodule and the read wait control submodule realize a function of the SPI module to refresh and read data at regular time by controlling delay counting.

In the embodiment, the state schedule control module, the register group module and the count signal generation module form a state machine system. On the basis of the schedule action and the work state of the state schedule control module, after sensor data reading is started, the enable control register auto_read_en is set as 1, and each group of different addressing addresses (addr_search_0, addr_search_1 and addr_search_2), different addressing address lengths (addr_length_0, addr_Length_1 and addr_Length_2) and different read data lengths (byte_length_0, byte_Length_1 and byte_Length_2) configured by customization are automatically selected. Through programmable configuration of relevant register addresses, in combination with the counter, the state machine is driven to control a delay sending function. By utilizing a hardware acceleration data reading means, the sensor data may be automatically read continuously by means of the SPI, such that the automatic read control system may automatically read, in a certain time interval, different groups of data of the external memory to be read, software does not need to participate in data reading flow, and read efficiency of the data is effectively improved.

In the above embodiment, both the transmitted data buffer and the received data buffer are first-in and first-out queues, that is, the transmitted data buffer is a transmitting FIFO and the received data buffer is a receiving FIFO. The addressing address sent firstly by the address selection register is stored firstly by the transmitted data buffer, and the addressing address stored firstly by a queue head of the transmitted data buffer is sent firstly to the external memory to be read. The firstly read data of the external memory to be read is stored firstly by the received data buffer, and the data stored in a queue head of the received data buffer is send firstly, under control of the general DMA controller, to the external data memory. In the embodiment, dependence on the CPU or the DMA is reduced, automatic transportation of each group of data of the sensors is controlled, a plurality of groups of different destination addresses may be accessed in each round of reading the data, and a plurality of kinds of data information of the sensor may be read more efficiently. The system is further suitable for various sensors and bus interface devices.

The disclosure further provides an automatic read control method based on the automatic read control system. The automatic read control method is adaptable to the automatic read control system based on a hardware accelerated SPI interface, where the automatic read control system is connected to a CPU and an external memory to be read separately and includes a general SPI module, a general APB module, a general DMA controller, a state machine controller, a transmitted data buffer and a received data buffer. The method includes: step A, receiving, in an APB time sequence, configuration information transmitted by a CPU; step B, scheduling, under drive of a count signal of an internal driving source of the state machine controller and in combination with the configuration information, a corresponding work state; controlling a received data buffer to send addressing addresses of different groups of data of an external memory to be read to a transmitted data buffer in each round of reading; and then controlling, in combination with the scheduled corresponding work state, the received data buffer to read out, according to a certain read frequency and by means of a DMA controller, the data of the external memory to be read in batches; and step C, generating, after one round of reading data of the external memory to be read is completed, an interrupt signal to inform the CPU that reading the data is completed, where a batch of data, read in each round, of an external memory to be read is divided into different groups according to the configuration information of the register group module, and a destination address and a source address configured for each group of data are different. According to the technical solution, a hardware system reads the data to be read of the external memory in batches and frequently, such that a frequency of CPU inquiry is saved, a data transmission process is accelerated, smoothness of software execution is improved, and efficiency of software and hardware cooperative acceleration is improved.

Specifically, the registers inside the state machine controller includes: the enable control register, the address length selection register, the address selection register, the byte length selection register, the maximum group number register, the read wait time register, the group interval time register and the re-read wait time register. The counters inside the state machine controller includes: the group counter, the read wait counter, the byte counter, the maximum group number register, the group interval counter, and the re-read wait counter. Signal communication thereof may refer to the above embodiments.

Figure 2:
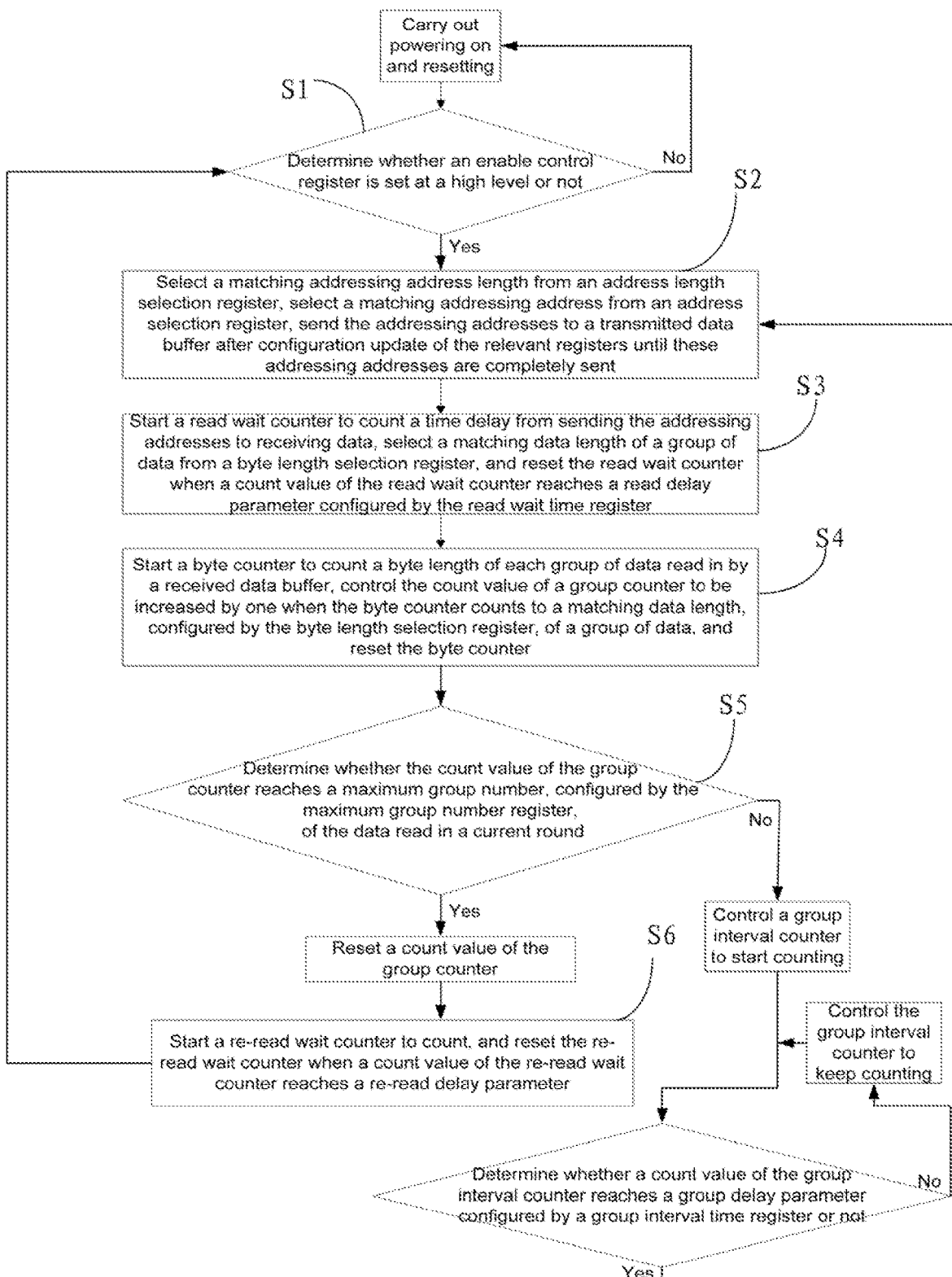
FIG. 2 is a flowchart of one embodiment of an automatic read control method based on a hardware accelerated SPI interface.

Step B is specifically shown in FIG. 2, and includes: step S1, determine whether the enable control register is set at a high level or not; if yes, enter step S2; and otherwise, keep the enable control register in a reset state. Step S2, select an addressing address length matching a current count value of the group counter from the address length selection register, select an addressing address matching the current count value of the group counter from the address selection register, send the addressing address in the address selection register to the transmitted data buffer after the address length selection register and the address selection register complete configuration update, and enter S3 after the transmitted data buffer completes sending the addressing addresses. Step S3, start the read wait counter to count a time delay, from sending the addressing addresses to receiving the data, of the automatic read control system, select a data length matching the current count value of the group counter from a byte length selection register, reset the read wait counter when the count value of the read wait counter reaches the read delay parameter configured by the read wait time register, and then enter S4. Step S4, start the byte counter to count a byte length of each group of data read in by the received data buffer, control the count value of the group counter to be increased by one when the byte counter counts to a data length configured by the byte length selection register and matching the current count value of the group counter, reset the byte counter, and then enter S5, such that the state schedule control module controls the received data buffer to complete reading the current group of data of the external memory to be read and start reading the next group of data of the external memory to be read. Step S5, determine whether the count value of the group counter reaches a maximum group number, configured by the maximum group number register, of the data read in the current round or not; if yes, reset the group counter, and then enter S6; and otherwise, control the group interval counter to start counting, and determine whether the count value of the group interval counter reaches the group delay parameter configured by the group interval time register or not; if yes, return to S2, so as to prepare to read the next group of data of the external memory to be read; and otherwise, control the group interval counter to keep counting. Step S6, start the re-read wait counter to count, so as to delay and wait for the end of reading the data of the external memory to be read in a current round; reset the re-read wait counter when a count value of the re-read wait counter reaches a re-read delay parameter configured by the re-read wait time register, and return to S1, so as to start reading a next round of reading data of the external memory to be read; and meanwhile, set the interrupt request signal auto_read_int as 1 to inform the CPU that reading of all groups of sensor data in the current round is completed.

It is worth noting that the automatic read control method disclosed in the embodiment is a serial method step implemented on the basis of jump logic of a work state of the above state machine, and specific timing and counting parameters and the technical effect of a signal flow direction may refer to the above embodiment of the system, which will not be described in detail here, but a method flow disclosed in the embodiment may be realized by software codes. Meanwhile, steps S2 to S6 and step C mentioned above can be loaded in a hardware logic circuit in a certain embodiment to perform operations in parallel.

The automatic read control method further includes: send firstly, when the addressing address sent firstly by the address selection register is stored firstly by the transmitted data buffer, the addressing address stored firstly by a queue head of the transmitted data buffer to the external memory to be read; and send firstly, under control of the general DMA controller, when read firstly data of the external memory to be read is stored firstly by the received data buffer, the data stored in a queue head of the received data buffer to the external data memory.

Preferably, addressing of three different groups of destination addresses is supported in each round of reading and accessing data of the external memory to be read.

Finally, it should be noted that the above embodiments are merely intended for description of the technical solutions of the disclosure rather than limitation of the disclosure. Although the disclosure is described in detail with reference to the better embodiments, those of ordinary skill in the art should understand that they may still make modifications or equivalent replacements to the technical solutions of the disclosure without departing from the Spirit of the technical solutions of the disclosure, all of which should be encompassed within the scope of the technical solutions of the disclosure.

What is claimed is:

1. An automatic read control system based on a hardware accelerated SPI interface, the automatic read control system being connected to a central processing unit (CPU) and an external memory to be read separately, and comprises an SPI module, an advanced peripheral bus (APB) module, an interrupt generation module and a direct memory access (DMA) controller, wherein the automatic read control system further comprises a state machine controller, a transmitted data buffer and a received data buffer, the SPI module is configured to complete, in an SPI bus time sequence, data communication between the automatic read control system and the external memory to be read, and the SPI module is configured to provide a transmission channel between the transmitted data buffer and the external memory to be read and a transmission channel between the received data buffer and the external memory to be read for the transmitted data buffer and the received data buffer respectively;

the APB module is configured to configure, in an APB time sequence, configuration information sent by the CPU to a register group module;

the state machine controller is configured to receive the configuration information transmitted by the APB module, internally comprises a driving source for generating a count signal, a corresponding work state is scheduled under drive of the count signal of the driving source and in combination with the configuration information, and is controlled to read out data of the external memory to be read in batches according to a certain read frequency in each round of reading;

the transmitted data buffer is configured to receive an addressing address which is configured by the register group module and used for accessing and reading the data of the external memory to be read, such that in each round of accessing and reading, the automatic read control system supports addressing of destination addresses and/or source addresses of different groups of the data of the external memory to be read;

the received data buffer is configured to automatically store, under control of the DMA controller and according to the work state scheduled by the state machine controller, the data read from the external memory to be read and automatically transmit internally stored data to the external data memory for calling by software, wherein the DMA controller is used for reading out, by means of the SPI module, the data of the external memory to be read and storing the data in the received data buffer, or reading data from the received data buffer and storing the data in the external data memory; and the interrupt generation module is configured to generate an interrupt signal to inform the CPU that reading data is completed after the automatic read control system completes one round of reading the data of the external memory to be read, wherein a batch of data, read in each round, of the external memory to be read is divided into different groups according to the configuration information of the register group module, and each group of data matches a corresponding group number.

2. The automatic read control system according to claim 1, wherein the state machine controller comprises the register group module, a count signal generation module and a state schedule control module, the register group module is configured to receive the configuration information transmitted by the APB module, wherein the configuration information comprises delay configuration information and data length configuration information, and configure the state schedule control module, the count signal generation module, the transmitted data buffer and the received data buffer;

the count signal generation module comprises a timer and a counter, wherein the timer is configured to count to generate, by taking the delay configuration information of the register group module as a timing critical parameter, a timing signal for determining a read frequency of each group of the data of the external memory to be read; and the counter is configured to count to generate, by taking a data length configuration information of the register group module as a data length critical parameter, a count signal for determining a data length of each group of the data of the external memory to be read; and the state schedule control module is configured to generate, according to the configuration information of the register group module and counting information and timing information of the count signal generation module, a schedule action and a work state for the automatic read control system to automatically read the data of the external memory to be read such that the automatic read control system can automatically read, at a certain time interval, different groups of the data of the external memory to be read.

3. The automatic read control system according to claim 2, wherein the register group module comprises an enable control register, an address length selection register, an address selection register, a read wait time register, a byte length selection register, a group interval time register, a maximum group number register and a re-read wait time register, the enable control register being used for configuring reset information for the automatic read control system;

the address selection register is configured to configure an addressing address for the state schedule control module and the transmitted data buffer, wherein the addressing address matches a group number of a group to which a batch of the data of the external memory to be read is divided;

the address length selection register is configured to configure an addressing address length for the state schedule control module and the transmitted data buffer, wherein the addressing address length matches a group number of a group to which a batch of the data of the external memory to be read is divided;

the read wait time register is configured to configure a read delay parameter for the state schedule control module and the received data buffer, wherein the read delay parameter is a timing parameter set after the transmitted data buffer sends the addressing address and before the received data buffer starts receiving the data of the external memory to be read;

the byte length selection register is configured to configure a data length for reading the data of the external memory to be read for the state schedule control module and the received data buffer, wherein the data length matches a group number of a group to which a batch of the data of the external memory to be read is divided;

the group interval time register is configured to configure a group delay parameter for the state schedule control module and the received data buffer, wherein the group delay parameter is a time interval parameter for reading two adjacent groups of the data of the external memory to be read;

the maximum group number register is configured to configure a maximum group number of the data, read in each round, of the external memory to be read for the automatic read control system;

the re-read wait time register is configured to configure a re-read delay parameter for the automatic read control system, wherein the re-read delay parameter is a timing parameter set after the received data buffer completes a current round of receiving the data of the external memory to be read and before the received data buffer starts a next round of receiving the data of the external memory to be read;

the timing critical parameters comprise the read delay parameter configured by the read wait time register, the group delay parameter configured by the group interval time register, and the re-read delay parameter configured by the re-read wait time register; and the data length critical parameters comprise the data length configured by the byte length selection register and the maximum group number configured by the maximum group number register.

4. The automatic read control system according to claim 3, wherein the count signal generation module comprises a group counter, a read wait counter, a byte counter, a group interval counter and a re-read wait counter, the group counter is configured to count and output a group number of the data, currently read by the received data buffer, of the external memory to be read;

the read wait counter is configured to keep, after the transmitted data buffer sends the addressing address and before the received data buffer starts receiving data, counting until a first count value reaches the read delay parameter, and then being reset;

the byte counter is configured to count a byte length of data read in the received data buffer and reset each time a second count value reaches a data length matching a group number configured by the byte length selection register, wherein a data length of a group of data is the sum of byte lengths of the group of data;

the group interval counter is configured to keep counting during an interval of successively reading two adjacent groups of data by the received data buffer until a third count value reaches the group delay parameter, and then being reset;

the re-read wait counter is configured to keep counting after the automatic read control system completes a current round of reading the data of the external memory to be read and starts a next round of reading the data of the external memory to be read until a fourth count value reaches the re-read delay parameter, and then being reset;

the sum of count values of the read wait counter, the group interval counter and the re-read wait counter forming a timing signal for determining a read frequency of each group of the data of the external memory to be read;

the timer comprises the read wait counter, the group interval counter and the re-read wait counter; and the counter comprises a group counter and a byte counter.

5. The automatic read control system according to claim 4, wherein the state schedule control module comprises a reset work submodule, an addressing address configuration sending submodule, a read wait control submodule, a data read control submodule, a group interval read control submodule and a data read completion control submodule, the reset work submodule is configured to control, when the automatic read control system is powered on and reset, the enable control register to configure reset information and start the addressing address configuration sending submodule start working;

the addressing address configuration sending submodule is configured to select an addressing address length of a group of data matching a current fifth count value of the group counter from the address length selection register, select an addressing address matching a group number from the address selection register, send the addressing addresses in the address selection register to the transmitted date buffer after the address length selection register and the address selection register complete configuration update such that the transmitted data buffer can transmit, by means of the SPI module, an addressing address for reading the external memory to be read, and start the read wait control submodule start working after the transmitted date buffer sends the addressing addresses;

the read wait control submodule is configured to start the read wait counter to count a time delay, from sending the addressing address to receive a data, of the automatic read control system, resetting the read wait counter when the first count value of the read wait counter reaches the read delay parameter, and then control the data read control submodule start working; and select a data length matching a group number from the byte length selection register before the first count value of the read wait counter reaches the read delay parameter;

a data read control submodule is configured to start the byte counter to count a byte length of each group of data read in by the received data buffer, control the fifth count value of the group counter to be increased by one when the byte counter counts to a data length matching the group number configured by the byte length selection register, and reset the byte counter, such that the state schedule control module controls the received data buffer to complete reading a current group of data of the external memory to be read and start reading a next group of data of the external memory to be read; and then control the group interval read control submodule start working;

the group interval read control submodule is configured to reset the fifth count value of the group counter when the fifth count value of the group counter reaches a maximum group number, configured by the maximum group number register, of data read in the current round, control the data read completion control submodule start working, and send an interrupt signal to the CPU; otherwise, control the group interval counter to start counting, and schedule the addressing address configuration sending submodule to reenter a work state when the third count value of the group interval counter reaches the group delay parameter, so as to prepare to read the next group of the data of the external memory to be read; and the data read completion control submodule is configured to start the re-read wait counter counting so as to delay and wait for completion of a current round of reading the data of the external memory to be read, reset the re-read wait counter when the fourth count value of the re-read wait counter reaches the re-read delay parameter, and schedule the reset work submodule to reenter a work state so as to start a next round of reading the data of the external memory to be read.

6. The automatic read control system according to claim 3, wherein the transmitted data buffer and the received data buffer are both first-in first-out queues;

the addressing address which is sent out firstly by the address selection register is stored firstly by the transmitted data buffer, and an addressing address stored in a queue head of the transmitted data buffer is sent firstly to the external memory to be read; and read firstly the data of the external memory to be read is stored firstly by the received data buffer, and data stored in a queue head of the received data buffer is sent firstly to the external data memory under control of the DMA controller.

7. The automatic read control system according to claim 1, wherein the automatic read control system supports addressing of three different groups of destination addresses in a round of reading and accessing the data of the external memory to be read.

8. The automatic read control system according to claim 4, wherein the transmitted data buffer and the received data buffer are both first-in first-out queues;

the addressing address which is sent out firstly by the address selection register is stored firstly by the transmitted data buffer, and an addressing address stored in a queue head of the transmitted data buffer is sent firstly to the external memory to be read; and read firstly the data of the external memory to be read is stored firstly by the received data buffer, and data stored in a queue head of the received data buffer is sent firstly to the external data memory under control of the DMA controller.

9. The automatic read control system according to claim 5, wherein the transmitted data buffer and the received data buffer are both first-in first-out queues;

the addressing address which is sent out firstly by the address selection register is stored firstly by the transmitted data buffer, and an addressing address stored in a queue head of the transmitted data buffer is sent firstly to the external memory to be read; and read firstly the data of the external memory to be read is stored firstly by the received data buffer, and data stored in a queue head of the received data buffer is sent firstly to the external data memory under control of the DMA controller.

10. The automatic read control system according to claim 2, wherein the automatic read control system supports addressing of three different groups of destination addresses in a round of reading and accessing the data of the external memory to be read.

11. The automatic read control system according to claim 3, wherein the automatic read control system supports addressing of three different groups of destination addresses in a round of reading and accessing the data of the external memory to be read.

12. The automatic read control system according to claim 4, wherein the automatic read control system supports addressing of three different groups of destination addresses in a round of reading and accessing the data of the external memory to be read.

13. The automatic read control system according to claim 5, wherein the automatic read control system supports addressing of three different groups of destination addresses in a round of reading and accessing the data of the external memory to be read.

14. An automatic read control method based on a hardware accelerated SPI interface wherein the automatic read control method is adaptable to an automatic read control method based on a hardware accelerated SPI interface, the automatic read control system is connected to a CPU and an external memory to be read separately and the automatic read control system comprises an SPI module, an APB module, a DMA controller, a state machine controller, a transmitted data buffer and a received data buffer, and the automatic read control method comprises:

step A, receiving, in an APB time sequence, configuration information transmitted by the CPU;

step B, scheduling, under drive of a count signal of an internal driving source of the state machine controller and in combination with the configuration information, a corresponding work state; controlling the received data buffer to send addressing addresses of different groups of data of the external memory to be read to the transmitted data buffer in each round of reading; and then controlling, in combination with the corresponding work state, the received data buffer to read out, according to a certain read frequency and by means of the DMA controller, the data of the external memory to be read in batches; and step C, generating, after one round of reading the data of the external memory to be read is completed, an interrupt signal to inform the CPU that reading data is completed, wherein a batch of data, read in each round, of the external memory to be read is divided into different groups according to the configuration information of a register group module, and a destination address and a source address configured for each group of data are different.

15. The automatic read control method according to claim 14, wherein the step B specifically comprises:

S1, entering S2 when an enable control register is set at a high level, and otherwise, keeping the enable control register in a reset state;

S2, selecting an addressing address length matching a current fifth count value of a group counter from an address length selection register, selecting an addressing address matching the current fifth count value of the group counter from an address selection register, sending the addressing address in the address selection register to the transmitted data buffer after the address length selection register and the address selection register complete configuration update, and entering S3 after the transmitted data buffer completes sending addressing addresses;

S3, starting a read wait counter to count a time delay, from sending the addressing addresses to receiving data, of the automatic read control system, selecting a data length matching the current fifth count value of the group counter from a byte length selection register, resetting the read wait counter when a fifth count value of the read wait counter reaches a read delay parameter configured by the read wait time register, and then entering S4;

S4, starting a byte counter to count a byte length of each group of data read in by a received data buffer, controlling the fifth count value of the group counter to be increased by one when the byte counter counts to a data length configured by the byte length selection register and matching the fifth current count value of the group counter, and resetting the byte counter; and then entering S5;

S5, determining whether the fifth count value of the group counter reaches a maximum group number, configured by the maximum group number register, of data read in a current round or not; in a case that the fifth count value of the group counter reaches the maximum group number, resetting the group counter, and then entering S6; and otherwise, controlling a group interval counter to start counting, and determining whether a third count value of the group interval counter reaches a group delay parameter configured by the group interval time register or not; in a case that the third count value of the group interval counter reaches the group delay parameter configured by the group interval time register, returning to S2; and otherwise, controlling the group interval counter to keep counting;

S6, staring a re-read wait counter to count, resetting the re-read wait counter when a fourth count value of the re-read wait counter reaches a re-read delay parameter configured by a re-read wait time register, and returning to S1, wherein a register inside the state machine controller comprises: the enable control register, the address length selection register, the address selection register, the byte length selection register, the maximum group number register, the read wait time register, the group interval time register and the re-read wait time register; and a counter inside the state machine controller comprises: the group counter, the read wait counter, the byte counter, the maximum group number register, the group interval counter and the re-read wait counter.

16. The automatic read control method according to claim 15, further comprises:

sending firstly, when the addressing address sent firstly by the address selection register is stored firstly by the transmitted data buffer, the addressing address stored first by a queue head of the transmitted data buffer to the external memory to be read; and sending firstly, under control of the DMA controller, when read firstly the data of the external memory to be read is stored firstly by the received data buffer, a data stored in a queue head of the received data buffer to the external data memory.

17. The automatic read control method according to claim 15, wherein addressing of three different groups of destination addresses is supported in each round of reading and accessing the data of the external memory to be read.

* * * * *